US008140995B1

(12) United States Patent
Zuverink et al.

(10) Patent No.: US 8,140,995 B1
(45) Date of Patent: Mar. 20, 2012

(54) METHOD AND APPARATUS INDICATING SCROLL POSITION ON A DISPLAY

(75) Inventors: David Zuverink, San Jose, CA (US); Dominic Butler, Bromley (GB)

(73) Assignee: Adobe Systems Incorporated, San Jose, CA (US)

( * ) Notice: Subject to any disclaimer, the term of this patent is extended or adjusted under 35 U.S.C. 154(b) by 952 days.

(21) Appl. No.: 12/103,285

(22) Filed: Apr. 15, 2008

(51) Int. Cl.
*G06F 3/048* (2006.01)

(52) U.S. Cl. ......... 715/784; 715/786; 715/805; 715/785

(58) Field of Classification Search ............. 715/784, 715/856, 785, 805
See application file for complete search history.

(56) References Cited

U.S. PATENT DOCUMENTS

| 5,950,216 A * | 9/1999 | Amro et al. ............ 715/209 |
| 6,081,818 A * | 6/2000 | Shieh .................... 715/210 |
| 7,627,819 B2 * | 12/2009 | Bedingfield, Sr. ...... 715/273 |
| 2007/0130200 A1 * | 6/2007 | Ogren .................. 707/104.1 |

OTHER PUBLICATIONS

Adobe Acrobat 7.0 Professional; copyright 1984-2005; Figures 1-4.*

* cited by examiner

*Primary Examiner* — William Bashore
*Assistant Examiner* — Sherrod Keaton
(74) *Attorney, Agent, or Firm* — Kilpatrick Townsend & Stockton LLP

(57) ABSTRACT

A method, apparatus and computer program product for indicating scroll position on a display is presented. A movement event requiring movement of content within a display area is identified. A location indicator is displayed at a first content location relative to content within the display area, the location indicator identifying that the first content location will remain visible on the display in response to the movement event. During movement of the content within the display area, a corresponding movement of the location indicator relative to the first content location is provided as the first content location moves with the content within the display area.

17 Claims, 9 Drawing Sheets

METHOD AND APPARATUS INDICATING SCROLL POSITION ON A DISPLAY

BACKGROUND

Devices which allow a user to access information have become ubiquitous. Cellular telephones (cell phones), Personal Digital Assistants (PDAs), hand held computers, laptop computers and the like allow user to access information about almost any topic in almost any form from almost any location. For example, a user can access the Internet from his or her cell phone on a bus and read a story about what happened in another part of the world.

Typically these devices are portable and include a display which is relatively small, such that the contents of an article or image cannot be displayed in its entirety on the display. The user is thus required to provide movement events (scroll down, page down, scroll over, and the like) in order to observe the entire piece of information. The information may be a text-based message or article, a picture, a video, an image, or the like.

In order for a user to view the entire piece of information, the user is required to scroll through the information. Scrolling can occur on a line-by-line basis, on a page-by-page basis, or a block-by-block basis leaving an overlap of 1-3 lines on the display.

SUMMARY

Conventional mechanisms such as those explained above suffer from a variety of deficiencies. In certain known embodiments, in order to view the entire piece of information, the user is required to scroll line-by-line. Users do not tend to lose their place using this method of scrolling, however, this can prove to be very tedious since the user needs to initiate a movement event (e.g., press the down button) for each line. Also, the user does not know how the text will scroll ahead of time.

In other known embodiments the user scrolls page-by-page and the text is animated as it scrolls. This method somewhat alleviates the issue of users losing track of where they are, but large blocks of text are difficult to follow as they animate on a screen. If the whole screen scrolls, the user still has to read to the very last word before advancing to the next screen. Without seeing the continuous flow of the sentence, users sometimes navigate back to the previous page to keep their place and make sure no information has been skipped. With the limited performance on many small screen devices, frame rates are not sufficient to achieve smooth animation, thereby making text additionally difficult to follow as it moves.

In still other known embodiments scrolling is preformed by somewhat less than a full page (i.e., block-by-block), leaving an overlap of 1-3 lines. Providing an overlap of several lines improves the reading experience because the user can advance the page at a point that naturally coincides with a break in the content (e.g., end of a sentence or end of a paragraph). However, it makes it more challenging to follow how far the text has scrolled. Without any animation, the user has to visually scan the top of the new page for where they left off. Even with animation, it is difficult for the user to keep their place on the page. Also, the user does not know how far the text will scroll ahead of time.

Since interfaces handle scrolling in different ways, even on the same device, users have difficulty knowing how content is going to scroll in any given situation. For example, in Microsoft Word Mobile®, text scrolls line by line in documents, but in Microsoft Internet Explorer Mobile® text scrolls a page at a time. Users do not have any indication other than trial and error or their memory of how the text will scroll on the screen.

Embodiments of the invention significantly overcome such deficiencies and provide mechanisms and techniques that provide a scroll position indicator on a display. To improve the experience of consuming content, especially large bodies of text, on a small screen device, an interaction method for scrolling is presented. The solution is a visual indicator that serves two purposes. First, a subtle visual indicator is provided before scrolling so the user can anticipate how scrolling will occur. Second, as the text or content is scrolling, the indicator becomes more prominent. The increased contrast allows the user's eyes to more easily follow the content as it moves across the screen. Once the scrolling animation has completed, the initial indicator disappears so it does not distract from the content and a second subtle indicator shows the user where the next scroll will occur.

By way of the presently disclosed method and apparatus for indicating scroll position on a display, the overall experience for reading text on a small screen device is improved. The present invention makes it easier for a user to keep their place while they are reading text that spans across multiple screens, as well as enabling users to anticipate how far the screen will scroll so that they can passively know when they have read far enough to initiate the scrolling action. The user can also achieve improved reading flow by choosing natural places in the content at which to initiate the scrolling action.

In a particular embodiment of a method for indicating scroll position, a movement event requiring movement of content within a display area is identified. A location indicator is displayed at a first content location relative to content within the display area, the location indicator identifying that the first content location will remain visible on the display in response to the movement event. During movement of the content within the display area, a corresponding movement of the location indicator relative to the first content location is provided as the first content location moves with the content within the display area.

Other embodiments include a computer readable medium having computer readable code thereon for indicating scroll position on a display. The computer readable medium includes instructions for identifying a movement event requiring movement of content within a display area. The computer readable medium also includes instructions for displaying a location indicator at a first content location relative to content within the display area, the location indicator identifying that the first content location will remain visible on the display in response to the movement event. Additionally, the computer readable medium includes instructions for during movement of the content within the display area, providing corresponding movement of the location indicator relative to the first content location as the first content location moves with the content within the display area.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that indicates scroll position on a display as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations indicating scroll position on a display as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
FIG. 1 is an image depicting a portable device having a display area showing a scroll location identifier.

Embodiments of the presently described method and apparatus indicating scroll position on a display utilize a vertical scroll break. A vertical scroll break is described as follows. For each scroll action taken, the distance the content travels may be less than or equal to the vertical viewable height of the screen. In cases where the distance is less than the height of the screen, the vertical scroll break is the location on the currently viewable screen that will become the top of the viewable area after a single scroll action is taken on the current view. For example, if after a single scroll action, the bottom two lines of text on the screen would become the top two lines of text on the screen, then the vertical scroll break is an imaginary line across the currently viewable content above the second line of text from the bottom of the screen before it is scrolled.

In use, a location indicator is provided in conjunction with animating the text in order to increase contrast as the animation occurs, thereby making it easier for the user to follow the animation with their eyes and keep their place as they read. The indicator provides a subtle indicator of how far the screen will scroll, thereby allowing the user to become passively aware of when they have read far enough to initiate the scrolling action. Users can easily select a natural break point in the content at which to initiate the scroll.

The interaction includes an indicator having at plurality of states. The indicator first appears at the bottom of the screen in its "subtle" state. Its purpose in this state is to indicate to the user the location of the vertical scroll break (the point which will become the top of the screen after scrolling). It does this in a subtle way as not to distract the user from reading the text.

When the scroll action (also referred to herein as a movement event) is invoked, the indication changes into its "contrast" state. One purpose of this state is to provide a high-contrast horizontal band across the screen as the text scrolls in order to make it easy for the user's eye to follow. After the scroll animation completes, the indicator turns to its off state. The purpose of this state is to avoid distracting the user from reading the content.

As the first indicator animates up the screen in its contrast state, the next indicator, still in its subtle state will scroll into view at the bottom of the screen. At the end of the scroll, the first indicator will change to its off state while the first indicator will remain in its subtle state until the next scroll action occurs.

The states may also animate between each other. For example, the contrast may fade in as it moves up the screen and then fade out completely until it is in its off state.

The indicator's size may be used to indicate the amount of overlap that will occur in the scroll. This allows the user to anticipate what content will be viewable after the scroll action, thereby allowing the user to choose a natural break in the flow of a sentence to advance the page. In other embodiments, the distance of the scrolling and the size of the indicator may vary depending on the content. For example, the vertical scroll break may be moved up or down in order to coincide with a paragraph break. The indicator would change its size to indicate to the user that the system has changed its parameter for the scrolling distance according to the content.

Referring to FIG. 1, a device 10 is shown. In this example device 10 comprises a cellular telephone, however any device having a display and capable of displaying text or images could also be used. Devices include, but are not limited to, cellular telephones, personal digital assistants (PDAs), handheld computers, laptop computers and the like. Device 10 includes a display area 12, wherein information is displayed for viewing by a user. In certain applications the display area can be used provide information. For example, a user could use device 12 to access a web site via a wireless Internet connection, and select an article to read. Typically, the display is only capable of displaying a portion of the article at a time.

In the example show in FIG. 1, a user has selected an article to read. The title of the article, as well as a first paragraph and a few lines of the second paragraph of the article are displayed in display area 12. The user, after viewing the portion of the article visible in display area 12, desires to view the next sequential portion of the article. The user thus would initiate a movement event requiring movement of content within the display area 12 for the device 10. A movement event may include a scroll down action, a scroll up action, a scroll left action or a scroll right action. In this example the user has selected a scroll down action, for example by pressing the down arrow key on device 12.

In response to receiving a movement event (i.e. pressing of the down arrow key on device 10), a location indicator 14 is displayed. In this example, location indicator 14 is presented as a lightly colored dashed line, extending across the display area 12 in a horizontal direction. The location indicator 14 is placed between lines of text in the display area 12 so as not to obfuscate the text being displayed to the user. The position of the location indicator 14 within display area 12 indicates that upon completion of the movement event (a scroll down), the text presently shown underneath the location indicator 14 will be presented at the top of the display area, the text above the location indicator 14 will scroll off the display area 12, and new text will be presented below the last line currently being displayed.

Figure 2:
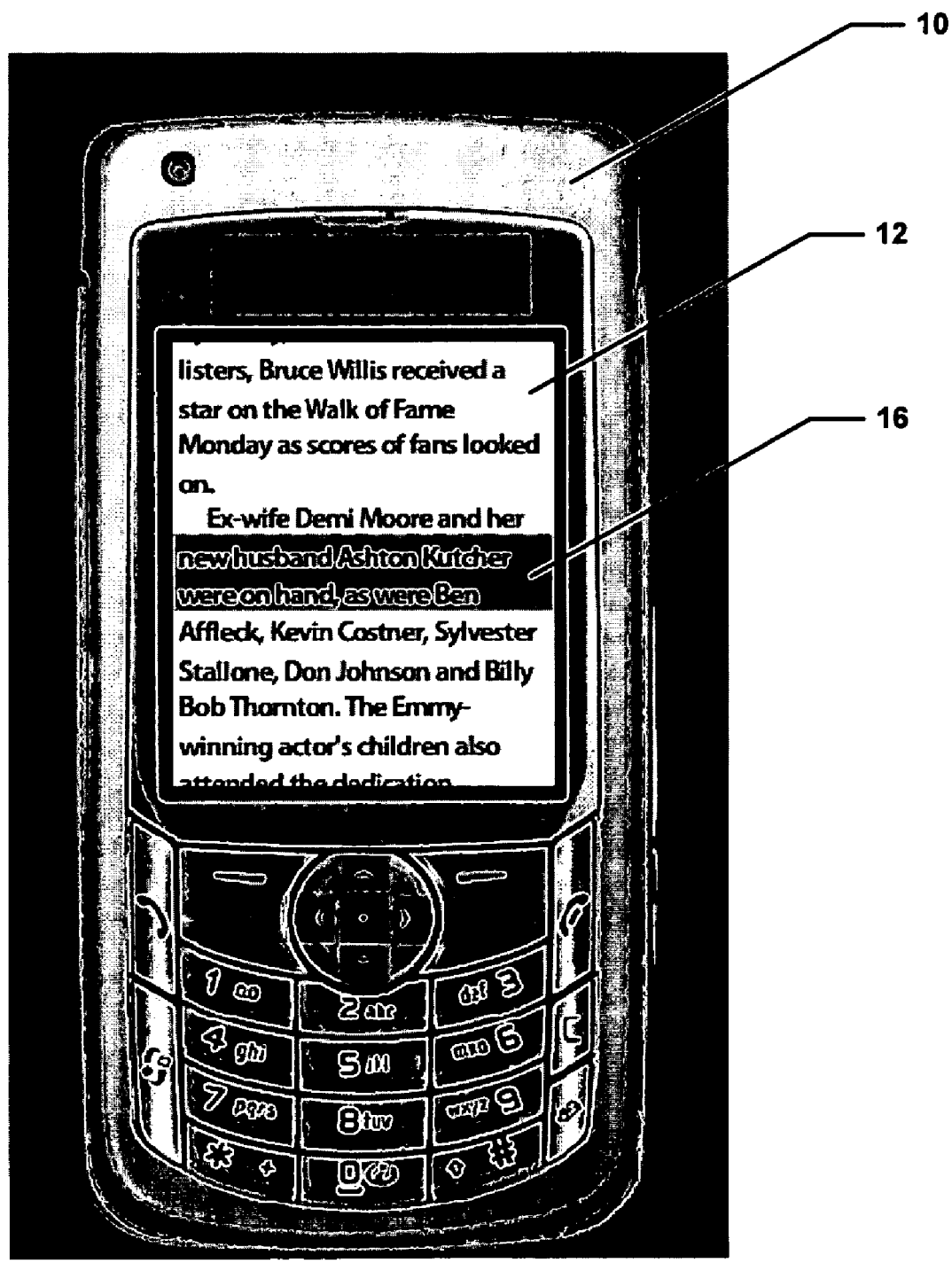
FIG. 2 is an image depicting the portable device having a display area showing a scroll location identifier as it traverses the display area.

Referring now to FIG. 2, the movement event that was initiated by the user pressing the down arrow key is in process. The location indicator, previously represented as a dashed line in FIG. 1, has been changed to a dark band 16. Note that the width of the location indicator 16 is two lines of text wide. The content has scrolled up the display area 12, and as can be seen now, additional lines which were previously not presented in display area 12 are now visible, while at the same time certain lines which were earlier visible have been scrolled off the display area 12. Also note, that in certain embodiments, the size of the changed location identifier 16 indicates the amount of text that will be retained from the display area 12 before the movement event was initiated. In this example, the size of changed location indicator 16 is two lines of text, which reflects that a two line overlap will be present between the previous displayed content prior to the movement event and the newly displayed content after the movement event completes. The bottom two lines of text displayed in FIG. 1 will be the top two lines of text displayed when the movement event finishes.

Figure 3:
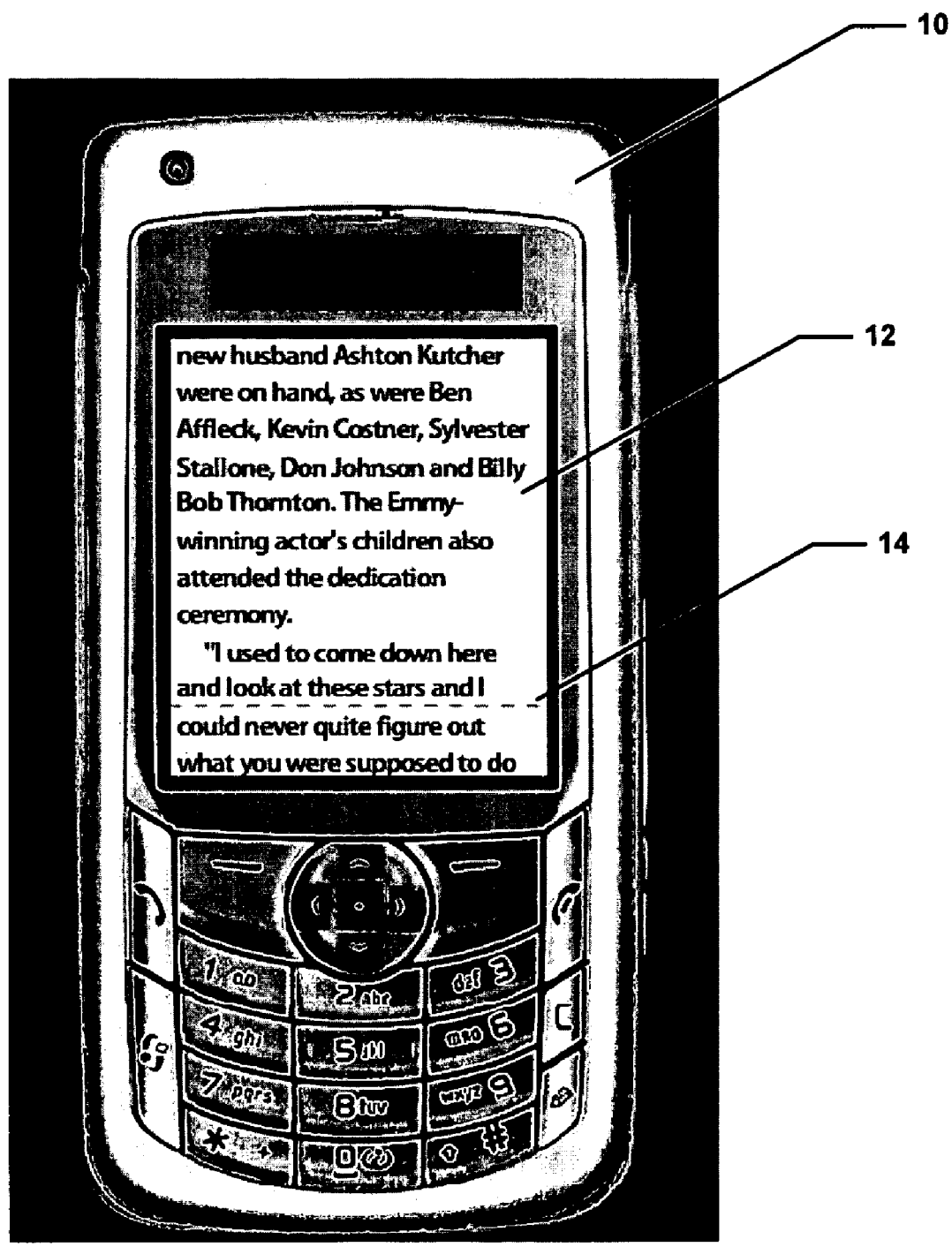
FIG. 3 is an image depicting the portable device having a display area showing a scroll location identifier for a new page of content.

Referring now to FIG. 3, device 10 now shows in it's display area 12 the new content (including the two line overlap discussed above). Also note that the original location indicator 14 is back in its original position (two lines up from the bottom of display area 12) and that location indicator 14 also has the same dashed line appearance. Device 10 is now ready to accept another movement event.

Figure 4:
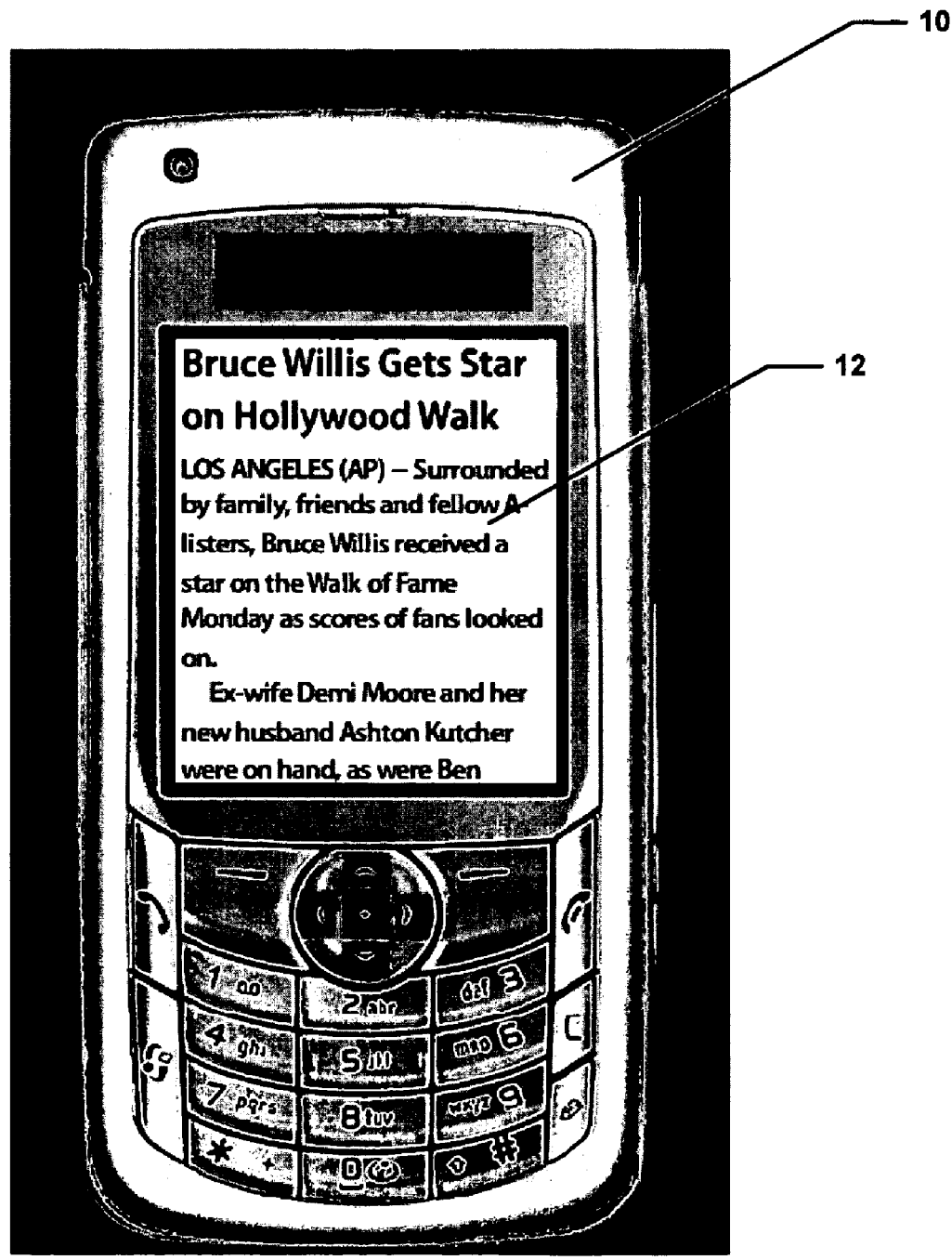
FIG. 4 is an image depicting the portable device having a display area prior to detecting a movement event.

In the above example, the location indicator 14 is displayed prior to the identifying of a movement event. In other embodiments the location indicator is not displayed until after the movement event has been initiated. Referring now to FIG. 4, a user has selected an article to read. The title of the article, as well as a first paragraph and a few lines of the second paragraph of the article are displayed. The user, after viewing the portion of the article visible in display area 12, desires to view the next sequential portion of the article. The user thus would initiate a movement event requiring movement of content within the display area 12 for the device 10. A movement event may include a scroll down action, a scroll up action, a scroll left action or a scroll right action. In this example the user has selected a scroll down action for example by pressing the down arrow key on device 12. The location indicator is not displayed until after the movement event has been initiated.

Figure 5:
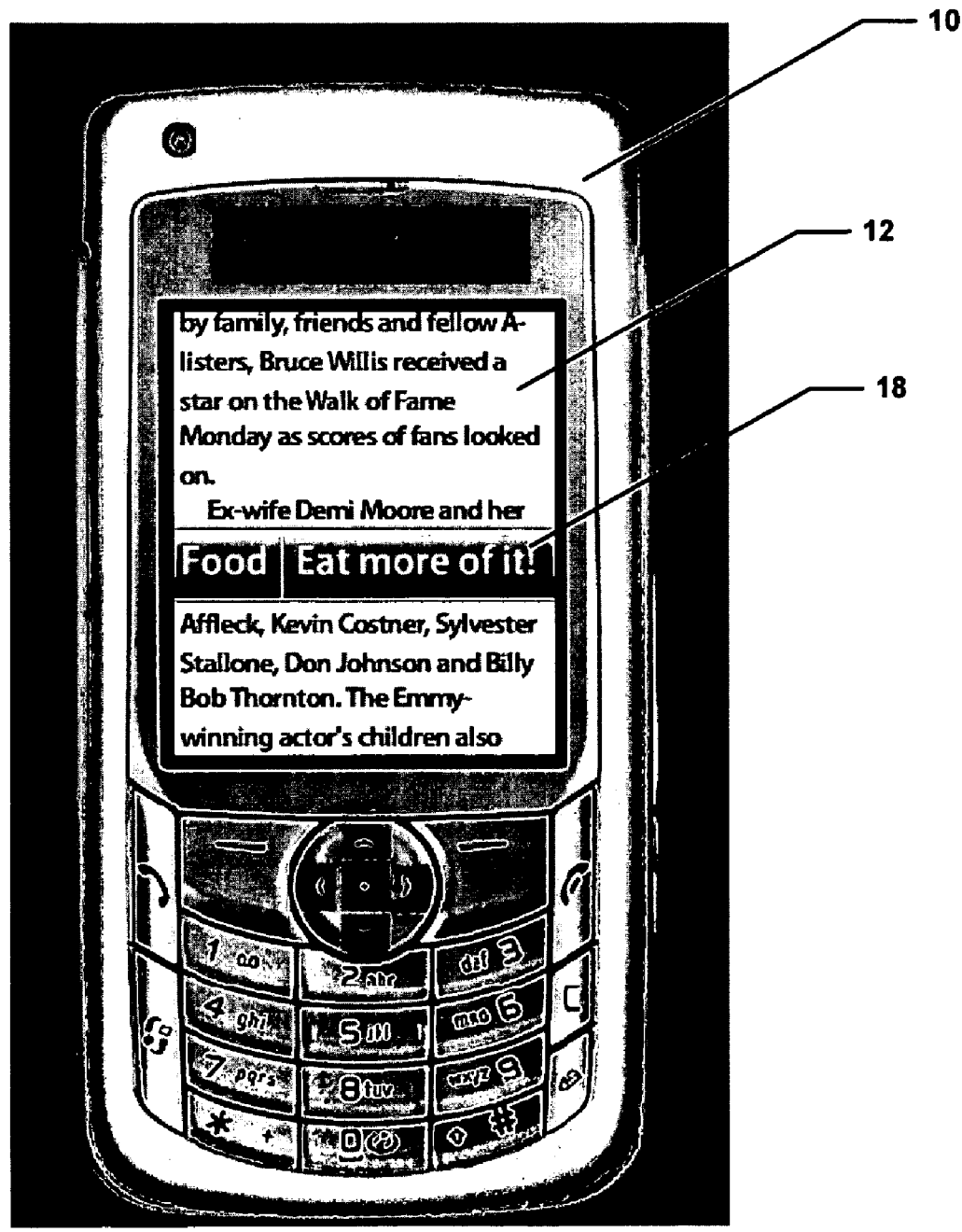
FIG. 5 is an image depicting the portable device having a display area showing a scroll location identifier as an advertisement.

Referring to FIG. 5, the movement event (a scroll down event) has been initiated and is underway. In this example, the location indicator 18 is shown as a message, such as an advertisement. The content has scrolled up the display area 12, and as can be seen now, additional lines that were previously not presented in display area 12 are now visible, while at the same time certain lines that were earlier visible have been scrolled off the display area 12. Also note, that in certain embodiments, the size of the location identifier 18 indicates the amount of text that will be retained from the display area 12 before the movement event was initiated. In this example, the size of location indicator 18 is two lines of text long, which reflects that a two line overlap will be present between the previous displayed content prior to the movement event and the newly displayed content after the movement event completes. The bottom two lines of text displayed in FIG. 4, will be the top two lines of text displayed when the movement event finishes.

Figure 6:
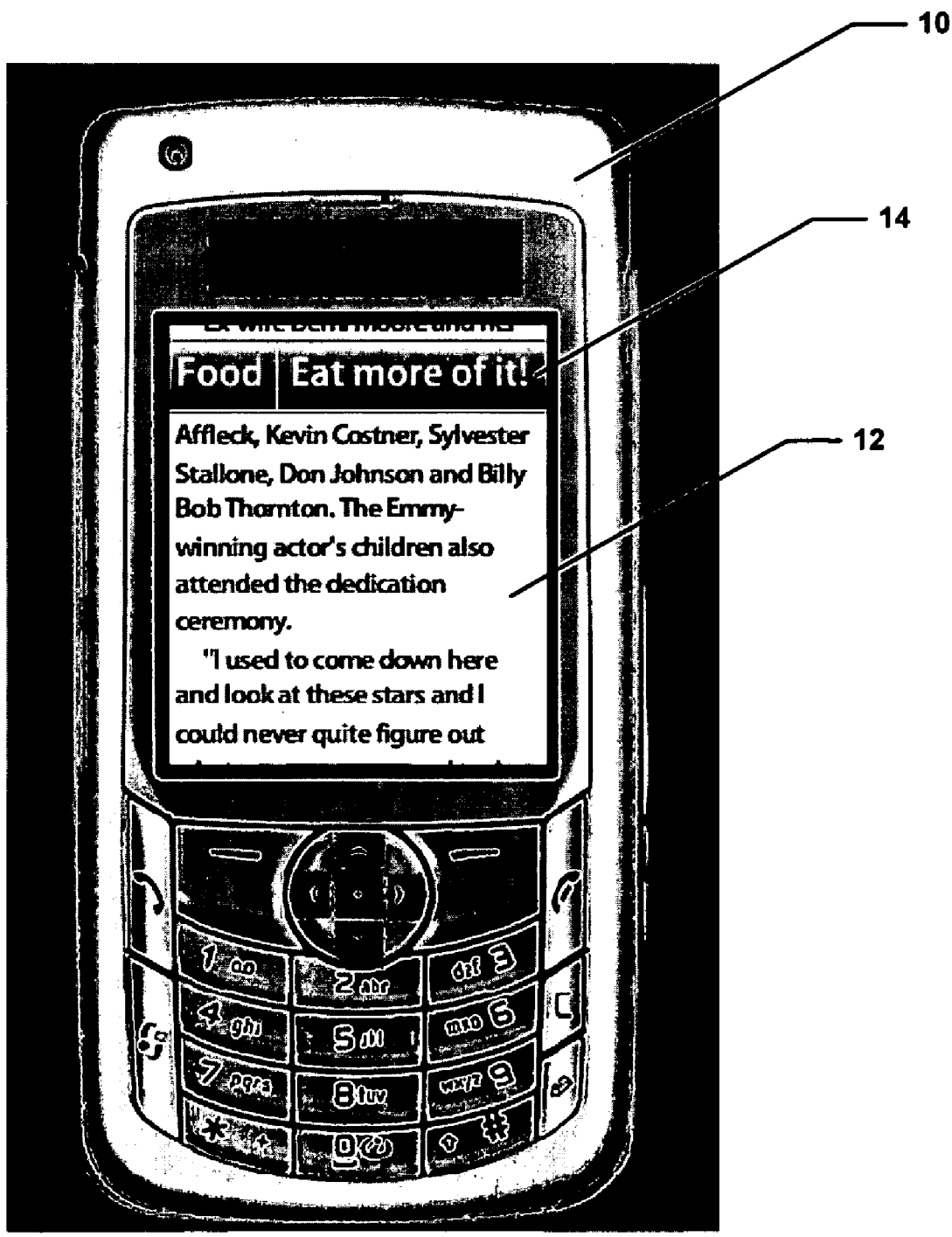
FIG. 6 is an image depicting the portable device having a display area showing the scroll location identifier at the top of the display as a new page of content is displayed.

FIG. 6 shows the location indicator 18 that has now scrolled up to near the top of display area 12 of device 10. At this point the location indicator will fade until it is no longer visible, thereby allowing the two lines of content obfuscated by the location indictor 18 to be observable by the user.

In certain embodiments, the location indicator gradually changes as it progresses from the lower portion of the display area to the upper portion of the display area. The change may be between two states (a first state having a small amount of contrast compared to the text and/or background to a second state having a larger amount of contrast compared to the text and/or background). The change may also be realized as a gradual fade between the first contrast state and the second contrast state, wherein the location identifier gets darker as it progresses up the display area.

The position of the location identifier in the above examples was two lines above he bottom of the display are of the device. In certain embodiments the positioning of the location identifier can be predetermined by the user. For example the user may prefer to have a three-line overlap such that the bottom three lines of text are maintained between movement events. In other embodiments the positioning of the location identifier may be variable depending upon the text, such as being positioned only at the end of sentence or paragraph. In the examples above, the movement event was a page scroll event, though it should be appreciated that other movement events (a paragraph at a time, etc.) could also be utilized. Also, while text was used as the content of the display area, the concepts apply in a similar fashion to any object being displayed. For example, a photograph, image, graph, spreadsheet or other type of information could also be presented and the same concepts utilized to scroll through the information apply.

Figure 7:
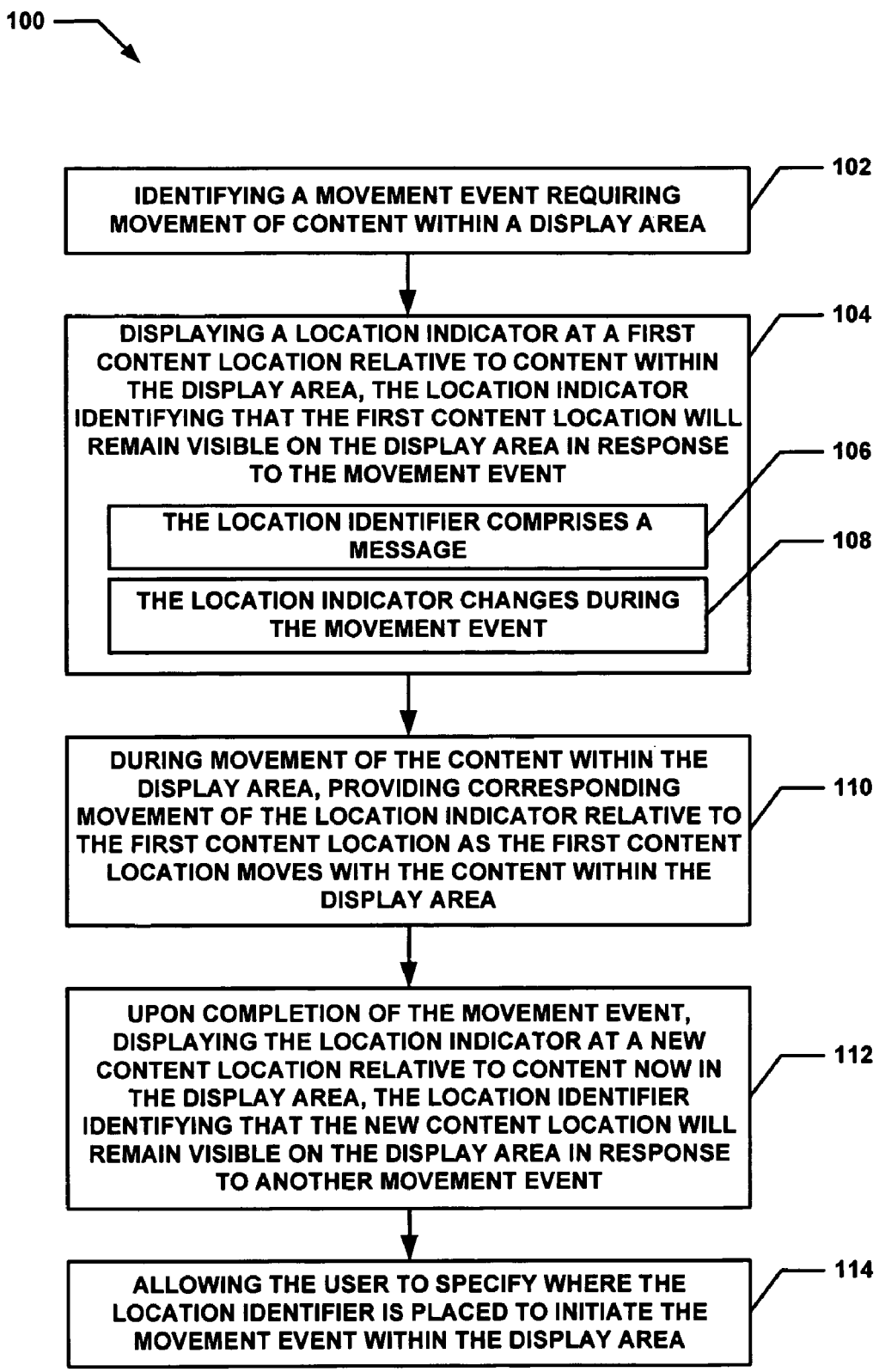
FIG. 7 depicts a flow diagram of a particular embodiment of a first method of indicating scroll position in a display in accordance with embodiments of the invention.
Figure 8:
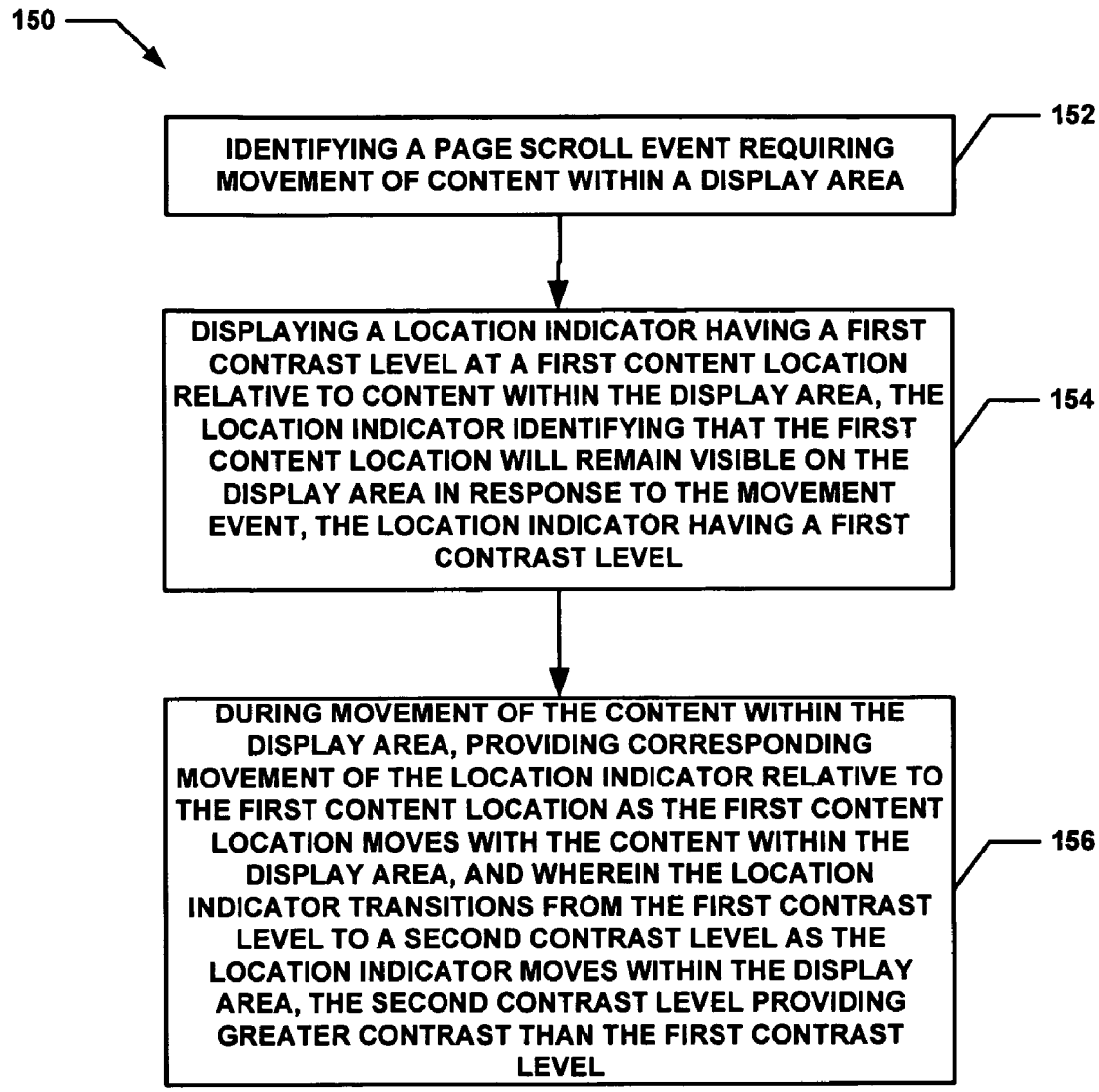
FIG. 8 depicts a flow diagram of a particular embodiment of a second method of indicating scroll position in a display in accordance with embodiments of the invention.

A flow chart of particular embodiments the presently disclosed methods are depicted in FIGS. 7 and 8. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, a particular embodiment of a method 100 for indicating scroll position on a display is shown. Method 100 begins with processing block 102 which discloses identifying a movement event requiring movement of content within a display area. A movement event may include a scroll down action, a scroll up action, a scroll left action or a scroll right action. In a particular example a user may select a scroll down action, for example by pressing a down arrow key on the device.

Processing block 104 states displaying a location indicator at a first content location relative to content within the display area, the location indicator identifying that the first content location will remain visible on the display in response to the movement event. This is referred to as a vertical scroll break. For each scroll action taken, the distance the content travels may be less than or equal to the vertical viewable height of the screen. In cases where the distance is less than the height of the screen, the vertical scroll break is the location on the currently viewable screen that will become the top of the viewable area after a single scroll action is taken on the current view. For example, if after a single scroll action, the bottom two lines of text on the screen would become the top two lines of text on the screen, then the vertical scroll break is an imaginary line across the currently viewable content above the second line of text from the bottom of the screen before it is scrolled.

Processing block 106 recites the location identifier comprises a message. In certain embodiments the message may be an advertisement.

Processing block 108 discloses wherein the location indicator changes during the movement event. In one embodiment the location indicator gradually changes as it progresses from the lower portion of the display area to the upper portion of the display area. The change may be between two states (a first state having a small amount of contrast compared to the text and/or background to a second state having a larger amount of contrast compared to the text and/or background). The change may also be realized as a gradual fade between the first contrast state and the second contrast state, wherein the location identifier gets darker as it progresses up the display area.

Processing block 110 states during movement of the content within the display area, providing corresponding movement of the location indicator relative to the first content location as the first content location moves with the content within the display area. Processing continues with processing block 112 which recites upon completion of the movement event, displaying the location indicator at a new content location relative to content now in the display area, the location identifier identifying that the new content location will remain visible on the display in response to another movement event.

Processing block 114 states allowing the user to specify where the location identifier is placed to initiate the movement event within the display. In certain embodiments the positioning of the location identifier can be predetermined by the user. For example the user may prefer to have a three-line overlap such that the bottom three lines of text are maintained between movement events. In other embodiments the positioning of the location identifier may be variable depending upon the text, such as being positioned only at the end of sentence or paragraph.

Referring now to FIG. 8, another particular embodiment of a method 150 of indicating scroll position on a display is shown. Method 150 begins with processing block 152 which discloses identifying a page scroll event requiring movement of content within a display area. A movement event may include a scroll down action, a scroll up action, a scroll left action or a scroll right action. In a particular example a user may select a scroll down action, for example by pressing a down arrow key on the device.

Processing block 154 states displaying a location indicator having a first contrast level at a first content location relative to content within the display area, the location indicator identifying that the first content location will remain visible on the display in response to the movement event, the location indicator having a first contrast level.

Processing block 156 recites during movement of the content within the display area, providing corresponding movement of the location indicator relative to the first content location as the first content location moves with the content within the display area, and wherein the location indicator transitions from the first contrast level to a second contrast level as the location indicator moves within the display, the second contrast level providing greater contrast than the first contrast level.

Figure 9:
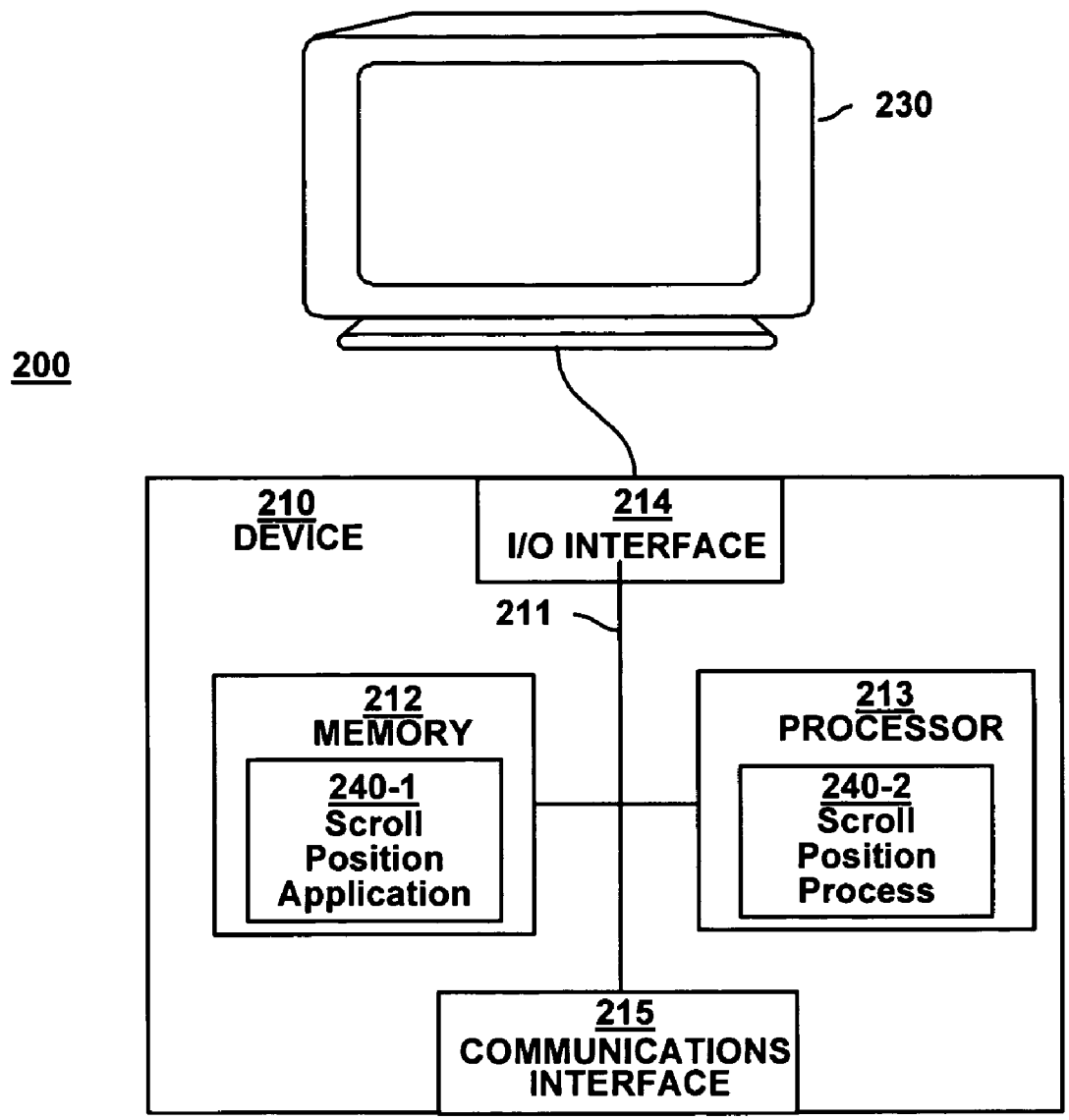
FIG. 9 illustrates an example device architecture for a device that indicates scroll position on a display in accordance with embodiments of the invention.

FIG. 9 is a block diagram illustrating an example device 100 for implementing scroll position application 140 and/or other related processes to carry out the different functionality as described herein.

As shown, device 200 of the present example includes an interconnect 211 that couples a memory system 212 and a processor 213 an input/output interface 214, and a communications interface 215.

As shown, memory system 212 is encoded with scroll position application 240-1. scroll position application 240-1 can be embodied as software code such as data and/or logic instructions (e.g., code stored in the memory or on another computer readable medium such as a disk) that support functionality according to different embodiments described herein.

During operation, processor 213 of device 200 accesses memory system 212 via the interconnect 211 in order to launch, run, execute, interpret or otherwise perform the logic instructions of the scroll position application 240-1. Execution of scroll position application 240-1 produces processing functionality in scroll position process 240-2. In other words, the scroll position process 240-2 represents one or more portions of the scroll position application 240-1 (or the entire application) performing within or upon the processor 213 in the computer system 200.

It should be noted that, in addition to the scroll position process 240-2, embodiments herein include the scroll position application 240-1 itself (i.e., the un-executed or non-performing logic instructions and/or data). The scroll position application 240-1 can be stored on a computer readable medium such as a floppy disk, hard disk, or optical medium. The scroll position application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of scroll position application 240-1 in processor 213 as the scroll position process 240-2. Those skilled in the art will understand that the device 200 can include other processes and/or software and hardware components, such as an operating system that controls allocation and use of hardware resources associated with the device 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   identifying a movement event for moving content within a display area;
   displaying a location indicator at a first content location in the content within the display area in response to identifying the movement event, the location indicator (i) having a first state of a visual representation configured to allow a user to view content associated with the first content location and (ii) identifying that the first content location is to remain visible on the display area in response to the movement event, wherein the first content location is capable of being user-specified or system-specified;

during movement of the content within the display area, providing corresponding movement of the location indicator with the first content location as the first content location moves within the display area and changing the location indicator from the first state to a second state of visual representation that is higher contrast than at least one other location within the display area during movement of the content, the location indicator in the second state of visual representation being automatically sized to represent an amount of content to be retained within the display area after movement of the content within the display area is complete; and changing the location indicator from the second state to a third state of visual representation that is an off state in which the higher contrast is removed in response to determining the movement event is complete.

2. The method of claim 1 further comprising responsive to completing the movement event, displaying said location indicator at a second content location in content within the display area after completing the movement event, the location indicator identifying that the second content location is to remain visible on the display area in response to a second movement event.

3. The method of claim 1 wherein said location indicator in the second state of visual representation comprises a message.

4. The method of claim 1 wherein said displaying a location indicator is performed prior to said identifying a movement event.

5. The method of claim 1 further comprising allowing a user to specify where said location indicator is placed with respect to the content to initiate the movement event within said display area.

6. A method comprising:

identifying a page scroll event for moving content within a display area;

displaying a location indicator having a first contrast level at a first content location in the content within the display area in response to identifying the page scroll event, the location indicator identifying that the first content location is to remain visible on the display area in response to the movement event, wherein the first content location is capable of being user-specified or system-specified; and during movement of the content within the display area, providing corresponding movement of the location indicator with the first content location as the first content location moves within the display area, and wherein said location indicator transitions from the first contrast level to a second contrast level as said location indicator moves within said display area, said second contrast level providing greater contrast than said first contrast level and is automatically sized to represent an amount of content to be retained within the display area after movement of the content within the display area is complete; and changing the location indicator from the second contrast level to an off state in which the greater contrast of the second contrast level is removed in response to determining the page scroll is complete.

7. A non-transitory computer readable medium having computer readable code thereon, the medium comprising:

instructions for identifying a movement event for moving content within a display area;

instructions for displaying a location indicator at a first content location in the content within the display area, the location indicator configured for (i) having a first state of visual representation configured to allow a user to view content associated with the first content location and (ii) identifying that the first content location is to remain visible on the display area in response to the movement event, wherein the first content location is capable of being user-specified or system-specified;

instructions for, during movement of the content within the display area, providing corresponding movement of the location indicator with the first content location as the first content location moves within the display area and changing the location indicator from the first state to a second state of visual representation that is higher contrast than at least one other location within the display area during movement of the content, wherein the location indicator in the second state of visual representation is configured to be automatically sized to represent an amount of content to be retained within the display area after movement of the content within the display area is complete; and instructions for changing the location indicator from the second state to a third state of visual representation that is an off state in which the higher contrast is removed in response to determining the movement event is complete.

8. The non-transitory computer readable medium of claim 7 further comprising instructions for, responsive to completing the movement event, displaying said location indicator at a second content location in content in the display area after completing the movement event, the location indicator identifying that the second content location is to remain visible on the display area in response to a second movement event.

9. The non-transitory computer readable medium of claim 7 wherein said location indicator in the second type of visual representation comprises a message.

10. The non-transitory computer readable medium of claim 7 wherein said instructions for displaying a location indicator are performed prior to said instructions for identifying a movement event.

11. The non-transitory computer readable medium of claim 7 further comprising instructions for allowing a user to specify where said location indicator is placed with respect to content to initiate the movement event within said display area.

12. A non-transitory computer readable medium having computer readable code thereon, the medium comprising:

instructions for identifying a page scroll event for moving content within a display area;

instructions for displaying a location indicator having a first contrast level at a first content location in the content within the display area in response to identifying the page scroll event, the location indicator configured for identifying that the first content location is to remain visible on the display area in response to the movement event, wherein the first content location is capable of being user-specified or system-specified;

instructions for, during movement of the content within the display area, providing corresponding movement of the location indicator with the first content location as the first content location moves within the display area, and wherein said location indicator is configured to transition from a first contrast level to a second contrast level as said location indicator moves within said display area, said second contrast level configured for providing greater contrast than said first contrast level and being automatically sized to represent an amount of content to be retained within the display area after movement of the content within the display area is complete; and instructions for changing the location indicator from the second contrast level to an off state in which the greater contrast of the second contrast level is removed in response to determining the page scroll is complete.

13. A system comprising:

a memory;

a processor; and wherein the memory is encoded with an application that when executed by the processor is configured to provide a process causing the operations of:

identifying a movement event for moving content within a display area;

displaying a location indicator at a first content location in the content within the display area in response to identifying the movement event, the location indicator being capable of (i) having a first state of a visual representation configured to allow a user to view content associated with the first content location and (ii) identifying that the first content location is to remain visible on the display area in response to the movement event, wherein the first content location is capable of being user-specified or system-specified;

during movement of the content within the display area, providing corresponding movement of the location indicator with the first content location as the first content location moves within the display area and changing the location indicator from the first state to a second state of visual representation that is higher contrast than at least one other location within the display area during movement of the content, wherein the location indicator in the second state of visual representation is capable of being automatically sized to represent an amount of content to be retained within the display area after movement of the content within the display area is complete; and changing the location indicator from the second state to a third state of visual representation that is an off state in which the higher contrast is removed in response to determining the movement event is complete.

14. The system of claim 13 wherein the application when executed by the processor causes further operations of: responsive to completing the movement event, displaying said location indicator at a second content location in content in the display area after completing the movement event, the location indicator identifying that the second content location is to remain visible on the display area in response to a second movement event.

15. The system of claim 13 wherein said location indicator in the second type of visual representation comprises a message.

16. The system of claim 13 wherein the application when executed by the processor is configured to cause the operation of displaying a location identifier prior to the operation of identifying a movement event.

17. The system of claim 13, wherein the processor and the memory are disposed in a cellular telephone configured for providing the display area.

\* \* \* \* \*